UNITED STATES PATENT OFFICE.

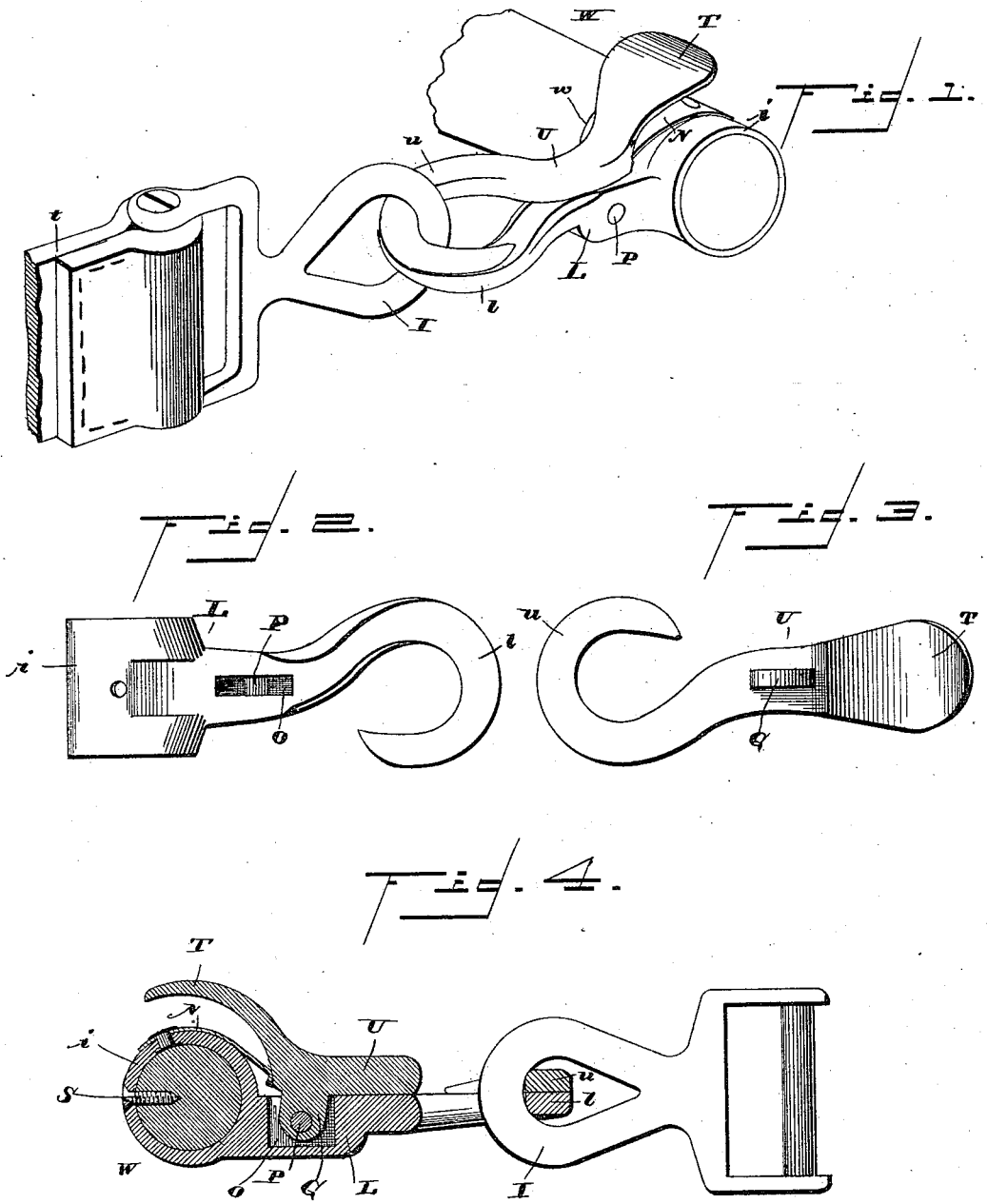

ABRAHAM SANT, SR., AND EDWARD A. BOARDWELL, OF WHITEHALL, MICHIGAN.

WHIFFLETREE-HOOK.

SPECIFICATION forming part of Letters Patent No. 428,354, dated May 20, 1890.

Application filed February 5, 1890. Serial No. 339,269. (No model.)

*To all whom it may concern:*

Be it known that we, ABRAHAM SANT, Sr., and EDWARD A. BOARDWELL, citizens of the United States, residing at Whitehall, in the county of Muskegon and State of Michigan, have invented a new and useful Whiffletree-Hook, of which the following is a specification.

This invention relates to whiffletree-hooks; and it consists of a pair of hooks opening in opposite directions and registering in size, one of said hooks being secured to the end of a whiffletree and the other pivoted to the first on a horizontal or transverse pivot, together with certain details of construction, all as hereinafter more fully described, and illustrated in the accompanying drawings, wherein—

Figure 1 is a perspective view of one end of a whiffletree with our improved hook attached thereto, showing the manner in which the eye in the rear end of the trace is connected with the hook. Fig. 2 is a plan view of the lower member of the hook. Fig. 3 is a bottom plan view of the upper member, and Fig. 4 is a longitudinal section of the hook with the trace-eye connected therewith.

The letter W designates a whiffletree, $t$ a trace, and I a metallic eye in the rear end of the trace, preferably of that character which is adapted to stand normally in a vertical plane—that is, in line with the trace itself—all as is well known in the art and forming no part of the present invention.

The letter L designates the lower member of our improved whiffletree-hook, which lower member has a transverse eye $i$ at the rear end of its body, and preferably formed integral therewith. This eye is slipped over the end of the whiffletree, preferably to a shoulder $w$ thereon, and a screw S inserted through a hole in the rear face of the eye into the body of the whiffletree to hold the parts in relative position, all as will be clearly understood without a more explicit description.

The letter U designates the upper member of the hook, whose body is extended rearwardly and upwardly above and around the eye $i$, and there broadened so as to form the thumb-piece T. Upon the under side of this body is the integral lug G, which projects downwardly therefrom, and normally fits loosely in a socket O in the upper face of the lower member L. A transverse pin P passes through the walls of this socket and through the body of the lug G, whereby the upper member U is pivotally connected to and carried by the lower member L. A (preferably) leaf-spring N is mounted at a suitable point on the lower member—as, for instance, where shown—and bears upwardly beneath the inner arm of the upper member, whereby the front arm thereof is thrown normally down upon the front arm of the lower member. The said front arms of these members taper both laterally and vertically almost to a point at their extreme tips, and their bodies $u$ and $l$ are curved in opposite directions, whereby they form hooks opening in opposite directions. The meeting faces of these hooked arms are flattened, whereas the other faces are preferably rounded, as shown, and as well known in the art. The pointed tips are bent slightly inward, so that they will stand beneath the centers of the bodies of the opposite members upon which they lie, whereby said points are always covered and injury to the operator or to the animal is rendered impossible.

Our improved hook having been properly attached to the end of the whiffletree, the operation is as follows: The thumb-piece T is borne upon, whereby the members of the hook are thrown apart. The eye I upon the trace $t$ is then passed into one hook and carried around the body thereof until it can be engaged behind the point of the other hook. It is then released and the force of the spring N automatically throws the two members together. In this condition they form a complete eye within which the eye I on the trace is engaged, and from which it is impossible to disengage it without a manual reversal of the operation just described.

The great and well-known objection to hooks of this character now on the market is that no matter how perfectly they are constructed and believed to operate, unless there is a complete line of metal passing through the eye on the trace, and that without one side of such line of metal being spring, so that it is liable to break or yield when not desired, the device is, perhaps, not imperfect, but at least unreliable, and the trace-eye may become accidentally uncoupled at the most trying moment.

In a hook constructed as above described the opening of the two members is resisted by the eye I itself, because as soon as they open they strike the sides of such eye. The spring N might even be dispensed with and the value of the hook in no wise impaired; but we prefer its use, as it adds but little to the expense and much to the successful operation of the hook, especially in the act of coupling and uncoupling the eye therefrom.

We claim as the salient features of our invention—

1. The herein-described whiffletree-hook, the same comprising a lower member secured to the whiffletree at its rear end, and an upper member pivotally connected at its center to the lower member, with its rear end passing over said whiffletree and standing normally out of contact therewith, the front ends of said members being provided with oppositely-opening hooks, substantially as set forth.

2. The herein-desbribed whiffletree-hook, the same comprising a lower member provided with a transverse eye at its rear end for engaging the whiffletree and an opening in its upper face near its center, an upper member provided with a lug loosely fitting in said opening and pivoted therein on a transverse pin, the rear end of said upper member being bent upwardly over said eye, and a spring for holding said rear ends normally apart, the front ends of said members being provided with oppositely-opening hooks, substantially as set forth.

3. The herein-described whiffletree-hook, the same comprising two members pivoted together, the lower one being connected to the end of the whiffletree, the front arms of said members being tapered laterally and vertically to a point at their tips, their meeting faces being flattened and their bodies bent in opposite directions into hooks, the open mouth of each hook being closed by the shank of the other hook, and means, substantially as described, for keeping said bodies normally together and for lifting the upper one from a point above the whiffletree to open the hook, as and for the purpose set forth.

4. In a whiffletree-hook, the combination, with the lower member L, provided with a lateral eye I at its rear end for engaging the whiffletree, the screw S passing through said eye into the whiffletree, and the spring N, secured to said eye and exerting an upward pressure, of the upper member U, pivotally connected at its center to said lower member, its rear end being curved over said eye and flattened, as at T, the front arms of said members being bent into oppositely-opening hooks and their bodies registering with each other when they are pressed together, all as and for the purpose set forth.

In testimony that we claim the foregoing as our own we have hereto affixed our signatures in presence of two witnesses.

ABRAHAM SANT, Sr.
EDWARD A. BOARDWELL.

Witnesses:
W. E. OSMUN,
A. E. BOARDWELL.